United States Patent [19]

Robinson

[11] 4,179,204

[45] Dec. 18, 1979

[54] METHOD AND APPARATUS FOR PHOTOGRAPHING CHEMILUMINESCENT OBJECTS

[76] Inventor: Gregory A. Robinson, 3746 Hutchins Hill Dr., Orchard Lake, Mich. 48033

[21] Appl. No.: 954,706

[22] Filed: Oct. 25, 1978

[51] Int. Cl.² ................ F21V 9/16; G03B 15/02; G03B 15/03; G03B 19/00

[52] U.S. Cl. ................ 354/145; 354/354; 362/16; 362/34

[58] Field of Search .......... 354/75, 76, 126, 145, 354/148, 354; 362/16, 34

[56] References Cited

U.S. PATENT DOCUMENTS 3,358,475  12/1967  Bockenstedt ............... 362/34 X
3,576,987  5/1971  Voight et al. ............... 362/34

Primary Examiner—L. T. Hix
Assistant Examiner—Thomas H. Tarcza
Attorney, Agent, or Firm—Krass & Young

[57] ABSTRACT

A method and apparatus for photographing a luminescent object, which in normal operation does not photograph satisfactorily. An electroluminescent light source of selected wavelength and intensity is inserted into the object and is connected to a camera-operated switch to artificially illuminate the object from within when the camera shutter is tripped. By proper selection of the light source, one may record on film what the human eye would observe looking at the chemiluminescent object in normal operation.

4 Claims, 1 Drawing Figure

U.S. Patent  Dec. 18, 1979  4,179,204
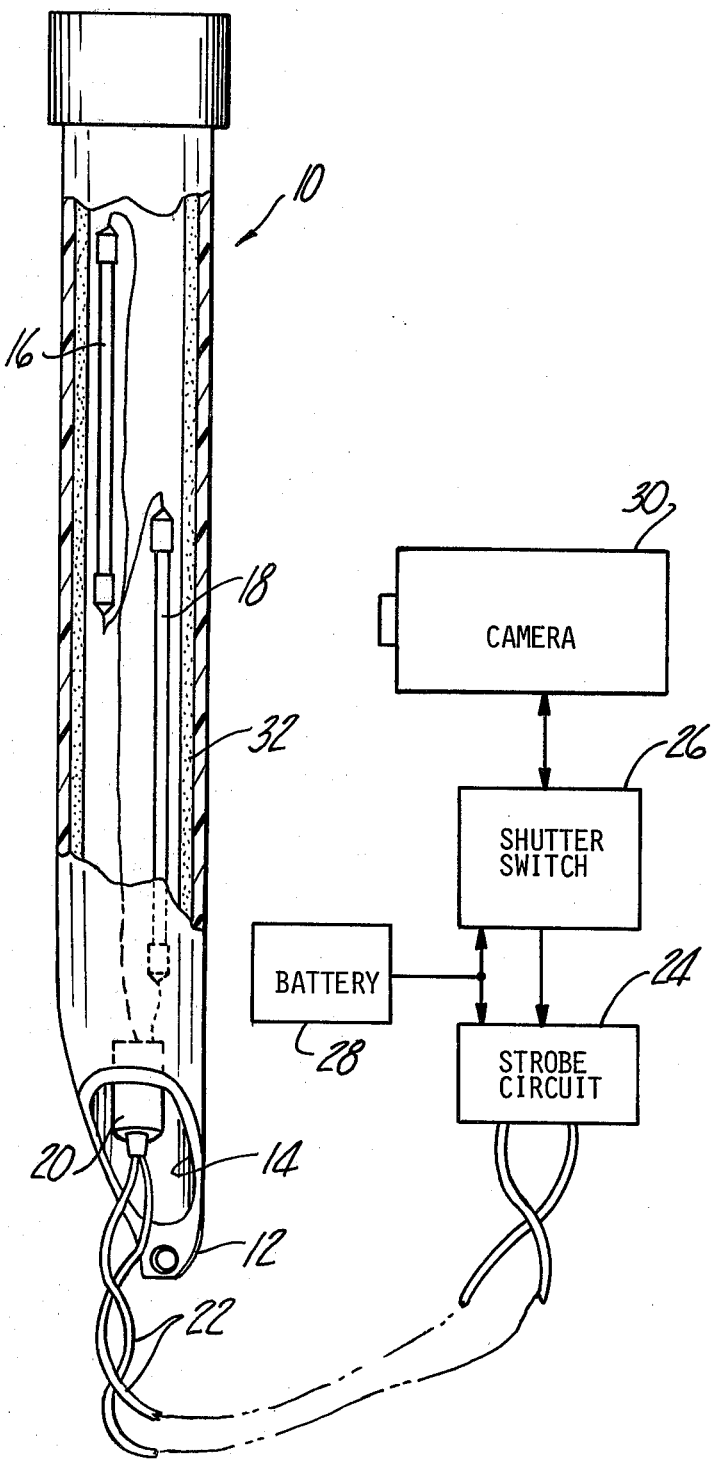

METHOD AND APPARATUS FOR PHOTOGRAPHING CHEMILUMINESCENT OBJECTS

INTRODUCTION

This invention relates to photography and particularly to the photography of an object which is normal operation is internally lighted by chemical luminescense.

BACKGROUND OF THE INVENTION

My principal objective is to provide a method and apparatus by which to obtain realistic photographs of a chemiluminescent object as if in actual operation but without the need for the expensive hand art work which has heretofore been required to improve upon the appearance of photographs taken using only the light generated by chemiluminescence.

In general, I accomplish this by electronically lighting the object from within itself during the exact instant of shutter opening and by controlling the quality and quantity of such light so as to record on film the response of the human eye to a chemically lighted object in actual operation.

SUMMARY OF THE INVENTION

I have invented a device which allows the making of photographs of a normally chemiluminescent object and which creates enough light of the proper intensity and color to record on a photograph what the human eye would see if actually viewing the chemiluminescent object. This eliminates the need for art work to correct either the lighting effect or the color of the photographed object. The device comprises the normally chemiluminescent object with the chemiluminescer removed. An electronic light source in combination with a color filter is substituted for the chemiluminescer to give the appropriate visual effect. A camera is then employed to photograph the electrically illuminated chemiluminescent object.

In the preferred embodiment, the light source is triggered by the camera to synchronize a flash of light with the shutter opening. In this embodiment at least one flash discharge tube of elongate configuration is inserted into the interior of the normally chemiluminescent object. A charging means is used to charge up a storage capacitor and the circuit means responsive to the camera trigger discharges the capacitor through the flash discharge tube to produce instantaneous illumination.

BRIEF DESCRIPTION OF THE DRAWING

The single FIGURE illustrates a chemically luminescent object known commonly as a "lightstick" modified in accordance with the invention to house suitable electronic lighting apparatus, and external camera-connected means for actuating the electronic lighting apparatus.

DETAILED DESCRIPTION OF THE SPECIFIC EMBODIMENT

Referring to the FIGURE the apparatus of the invention is shown to comprise the body 10 of a chemically luminescent device known as a "lightstick" and marketed under the trade name CYALUME by the American Cyanamid Co. The body 10 is made of flexible translucent plastic, is of slightly tapered cylindrical configuration, and has a small tab 12 extending from the lower extremity thereof to facilitate grasping by the human hand as well as hanging the device from nail or hook. In the condition intended by the manufacturer for normal operation, the body 10 is filled with one of two fluids which produce chemical luminescence when mixed. A second fluid is disposed within a fragile glass vial and inserted within the body 10 where it is kept out of intimate contact with the first fluid during storage. When chemical luminescense is desired, the tubular body 10 is flexed sufficiently to break the inner vial so that the fluids may be mixed. A more detailed description of the chemical light as well as the composition of the fluids may be found in U.S. Pat. Nos. 3,576,987 and 3,597,362.

In accordance with the invention the tubular body 10 of the chemical light is opened at the lower end to provide the aperture 14 and the luminescent fluid together with the glass vial are emptied out. Two elongated flash lamps 16 and 18 are disposed in slightly overlapping relationship within the tubular body 10 and are connected in parallel with a tuning circuit coil 20. The coil 20 is interconnected by a twisted pair of conductors 22 to a conventional capacitor type strobe circuit 24 which is activated by a camera shutter switch 26 in combination with a conventional battery pack 28. Switch 26 forms part of an electro-mechanical combination which is mounted on camera 30 to provide a trigger signal to strobe circuit 24 upon depression of the shutter switch. Hence the strobe circuit 24 activates the flash lamp 16 and 18 in synchronism with the opening of the shutter of the camera 30.

In accordance with the invention a color filter in the form of a tubular lining 32 of acetate film is disposed within the tubular body 10 so as to color balance the light output from flash lamps 16 and 18 whereby the intensity and wave length of the internal illumination of body 10 which is recorded on the film in camera 30 is a faithful reproduction of the response of the human eye to the chemical light which is normally produced by the lightstick when operated in accordance with the manufacturers specification and intent. To achieve this result the strobe flash lamps 16 and 18 are selected to produce a white daylight balanced light with a color temperature of 5500° K. when activated by approximately 510 volts dc for 50 watt-seconds. The acetate film 32 is selected to exhibit light transmission qualities as known in the industry as CC 150 green. For the simulation of higher intensity illumination a combination of CC 75 green and CC 75 yellow acetate films are preferred.

The method of the subject invention comprises proper preparation of the tubular body 10 by forming the opening 14 and inserting a suitably mechanically stabilized combination of flash lamps 16 and 18 so as to provide a distributed light along the entire length of the tubular body 10 as well as loading the camera 30 with appropriate daylight balanced film. The internal components of tubular body 10 are partially hidden by the acetate film 32 and the balance hidden by the human hand which grasps the lower end 12 of the tubular body 10. The lead wire 22 is taped to the holder's arm and/or otherwise concealed within the clothing of the holder so that it does not appear in the final photograph. When shutter switch 26 is depressed the strobe circuit 24 discharges the capacitor through coil 20 to the flash lamps 16 and 18 to illuminate the object 10 during the exact instant the shutter of camper 30 is opened thus providing realistic simulation of the chemical luminescense; i.e. a light pattern of the proper intensity and wave length is recorded on the film in the camera 30 to produce in finished photographs a response which matches that of the human eye to the actual chemical luminescense of the original equipment device represented by the tubular body 10 in the photographic process.

While we have shown and described several embodiments in accordance with the present invention, it is obvious that the same is not limited to but is susceptible to numerous changes and modifications as known to those skilled in the art, and therefore, I do not wish to be limited to the details shown and described herein but intend to cover all such changes and modifications as are encompassed by the scope of the appended claims.

The embodiments of the invention in which an exclusive property or privilege is claimed are defined as follows:

1. A method of photographing an object which is normally chemiluminescent having a hollow body of light transmitting material utilizing light produced internally of the object comprising the steps of:
    removing an end of the body to empty out any chemiluminescent materials therein and to provide access to the interior of the body;
    placing an electronic white flash light source within the body of the object;
    placing a film of material around the source and within the body to conceal the source and to add color to the light output therefrom, and
    simultaneously momentarily energizing the source to produce a light flash and opening the shutter of a camera aimed at the object to photograph the light flash output and the object itself.

2. Apparatus for enhancing the photographing of a normally chemiluminescent object having a hollow body comprising:
    a hollow, substantially cylindrical body of light-transmitting material adapted to be filled with a chemiluminescent substance; one end of the body being opened for the purpose of removing the chemiluminescent substance and to provide access to the interior of the body;
    an electronic white light source disposed within the body through the opening and having conductor means extending through the opening for connection to an energizing means;
    a film of material around the source and within the body to conceal the source and to add color to the light output therefrom; and
    means connected to the white light source through said opening for energizing said source synchronously with the operation of a camera arrayed for photographing said body.

3. Apparatus as defined in claim 2 wherein the electronic white light source further comprises:
    at least one flash discharge tube;
    a storage capacitor in combination with a charging means to charge the capacitor;
    a circuit means to discharge the capacitor through the flash discharge tubes.

4. Apparatus as defined in claim 3 wherein the circuit means to discharge the capacitor further comprises:
    a trigger signal providing means in synchronization with a shutter of a photographing means to discharge the capacitor in synchronization with said shutter.

* * * * *